United States Patent [19]

Han et al.

[11] Patent Number: 5,737,712
[45] Date of Patent: Apr. 7, 1998

[54] FUZZY LOGIC ADAPTIVE SHIFT CONTROL

[75] Inventors: Ed Erliang Han, Ann Arbor; John Edward Marano, Milford, both of Mich.

[73] Assignee: General Motors Corporation, Detroit, Mich.

[21] Appl. No.: 627,153

[22] Filed: Apr. 3, 1996

[51] Int. Cl.$^6$ .......................... G06F 17/00; B60K 41/06
[52] U.S. Cl. .................. 701/51; 701/57; 701/58; 701/61; 477/155; 477/156; 477/158
[58] Field of Search .............. 364/424.08, 424.086, 364/424.087, 424.088, 424.089, 424.09, 424.093, 424.095; 477/149, 150, 151, 155, 156, 158, 129; 395/905, 913

[56] References Cited

U.S. PATENT DOCUMENTS

| | | | |
|---|---|---|---|
| 5,086,665 | 2/1992 | Milunas et al. | 477/155 |
| 5,163,342 | 11/1992 | Pollack et al. | 74/866 |
| 5,251,509 | 10/1993 | Pollack et al. | 364/424.087 |
| 5,434,779 | 7/1995 | Vukovich et al. | 364/424.1 |

FOREIGN PATENT DOCUMENTS

| | | |
|---|---|---|
| 0377953 | 7/1990 | European Pat. Off. . |
| 0533419 | 3/1993 | European Pat. Off. . |
| 96 07559 | 3/1996 | Germany . |

*Primary Examiner*—Tan Q. Nguyen
*Attorney, Agent, or Firm*—Vincent A. Cichosz

[57] ABSTRACT

A method of establishing an adaptive pressure term in an automatic transmission having a pressure command developed from a base line pressure term and an adaptive pressure term extends implementation of adaptive pressure corrections during non-ideal periods of operation such as low temperatures, short operating cycles and driver variations by establishing an adaptive pressure term proportional to a measure of confidence in a pressure correction term calculated at each ratio change of the transmission. The measure of confidence is determined according to a variety of functions of predetermined powertrain operating parameters and measures of criticality.

8 Claims, 7 Drawing Sheets

| GEAR | RATIO | C1 | C2 | C3 | C4 | C5 | OC | CR |
|---|---|---|---|---|---|---|---|---|
| 1st | 3.61 | ON | OFF | OFF | ON | OFF | ON | OFF |
| 2nd | 1.85 | ON | ON | OFF | ON | OFF | ON | OFF |
| 3rd | 1.37 | ON | ON | OFF | ON | ON | OFF | OFF |
| 4th | 1.00 | ON | ON | ON | OFF | OFF | ON | OFF |
| 5th | 0.74 | ON | ON | ON | OFF | ON | OFF | OFF |
| P/N | – | OFF | OFF | OFF | OFF | OFF | ON | OFF |
| R | -2.06 | OFF | OFF | ON | OFF | OFF | ON | ON |

FIG. 2

| SOLENOID STATES | | | |
|---|---|---|---|
| GEAR | SOLENOID A | SOLENOID A | SOLENOID A |
| 1st | ON | OFF | ON |
| 2nd | OFF | OFF | ON |
| 3rd | OFF | ON | ON |
| 4th | OFF | OFF | OFF |
| 5th | OFF | ON | OFF |

FUZZY LOGIC ADAPTIVE SHIFT CONTROL

BACKGROUND

The present invention is related to automatic transmission shift control. More particularly, an improved adaptive pressure control for automatic transmissions is set forth which provides favorable adaptive control throughout a wider variety of operating conditions including low temperatures, short operating cycles and driver variations.

Automatic transmissions typically include a plurality of fluid operated devices such as clutches and brakes (hereafter clutches) which are automatically engaged and disengaged according to predefined patterns to establish different speed ratios between input and output shafts of the transmission. An electrically controlled automatic transmission completes a ratio change by engaging and disengaging certain clutches according to a prescribed pressure command based on predetermined vehicle parameters such as input torque, temperature and ratio, and further based on driver inputs such as accelerator pedal input.

Adaptive controls are known for optimizing shift performance in terms of shift delay, shift time, clutch stresses, and shift feel. Such adaptive controls have been found to be successful in adapting for differences between production units and time/cycle changes in a given transmission unit. Two exemplary adaptive controls are disclosed in U.S. Pat. Nos. 5,163,342 and 5,434,779 both assigned to the assignee of the present invention.

While the known adaptive controls significantly contribute to the art of transmission controls, some improvements can be made. For example, the adaptive controls are effective only when the vehicle powertrain remains within certain operating limits. That is to say, transmission temperature and throttle position inputs for example must be within certain limits in order that the adaptive portion of the shift controls are effected. In a majority of driving situations, this will provide for effective adaptive control; however, in certain driving situations such as short drive cycles and/or heavy city driving, adaptive controls may not realize an opportunity to be employed.

SUMMARY

Therefore, it is an object of the present invention to provide for an improved adaptive automatic transmission control.

According to one aspect of the present invention, conventional thresholds for invocation of adaptive controls are eliminated.

According to another aspect of the present invention, a fuzzy logic is employed to develop a confidence factor which allows for varying degrees of adaptive application in accordance with a set of powertrain operating parameters.

The present invention is implemented in an automatic transmission effective to establish speed ratio changes in accordance with predetermined line pressure commands including a base pressure term and an updatable adaptive pressure term. During a ratio change, a pressure correction term is provided such as by any of a variety of adaptive pressure calculation techniques. This is done irrespective of a variety of powertrain operating parameters which conventionally limit the establishment of such a pressure correction term. Based upon a plurality of functions of the variety of powertrain operating parameters, a plurality of degrees of confidence in the established pressure correction are calculated which are then aggregated in a predetermined fashion to arrive at an overall confidence factor to be used in updating the adaptive pressure term for use in subsequent ratio changes.

According to one preferred aspect of the invention, the plurality of degrees of confidence are weighted in accordance with relative measures of criticality.

According to another preferred aspect of the invention, a first degree of confidence is calculated according to predetermined criteria of transmission temperature change and transmission temperature, a second degree of confidence is calculated according to a predetermined criterion of transmission temperature, and a third degree of confidence is with respect to a predetermined criteria of throttle variation.

BRIEF DESCRIPTION OF THE DRAWINGS

The present invention will now be described, by way of example, with reference to the accompanying drawings, in which.

DETAILED DESCRIPTION OF THE INVENTION

Figure 1A:
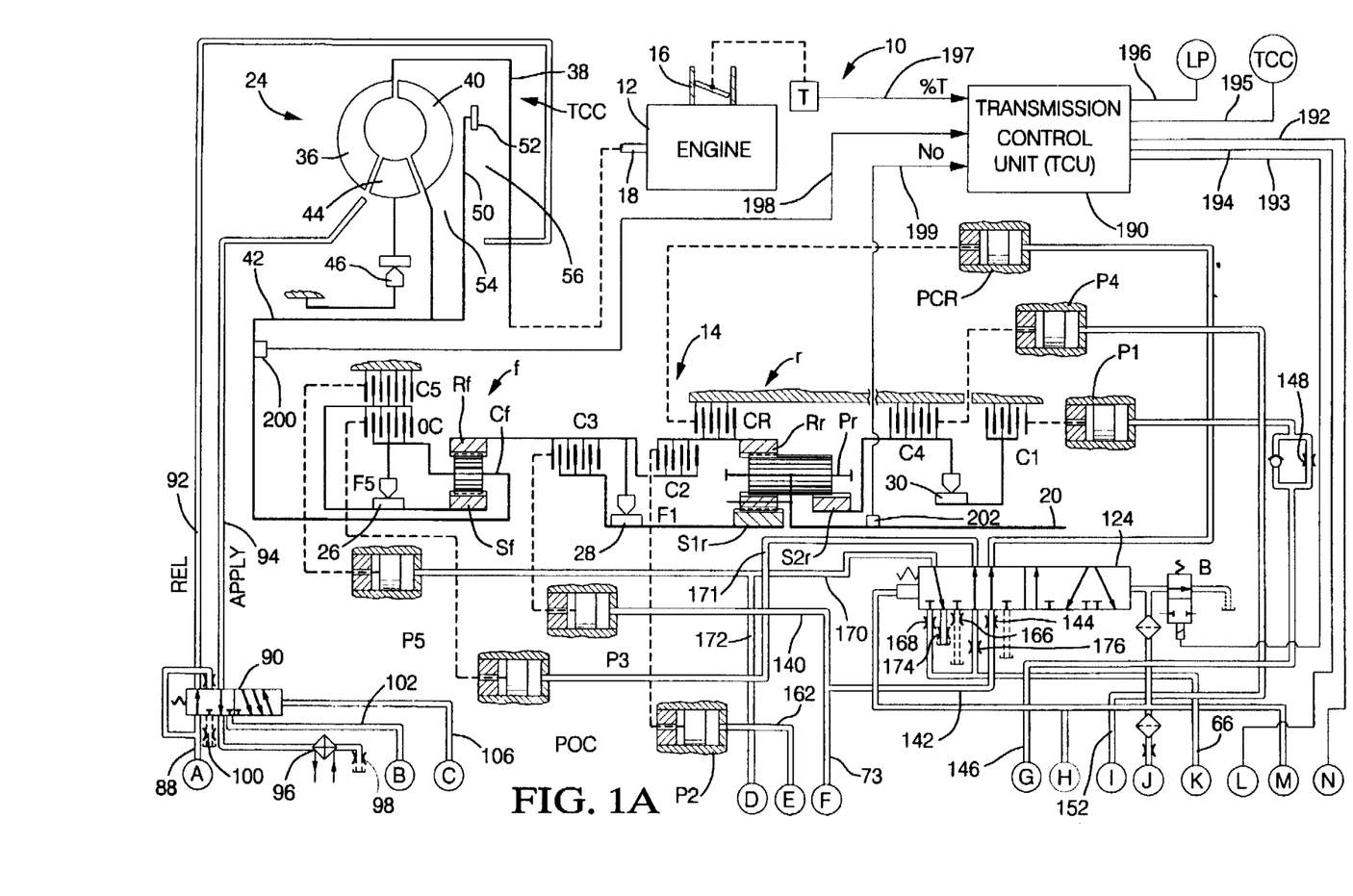
FIGS. 1A–1B form a schematic diagram of a five-speed automatic transmission controlled in accordance with this invention by a computer-based control unit.
Figure 1B:
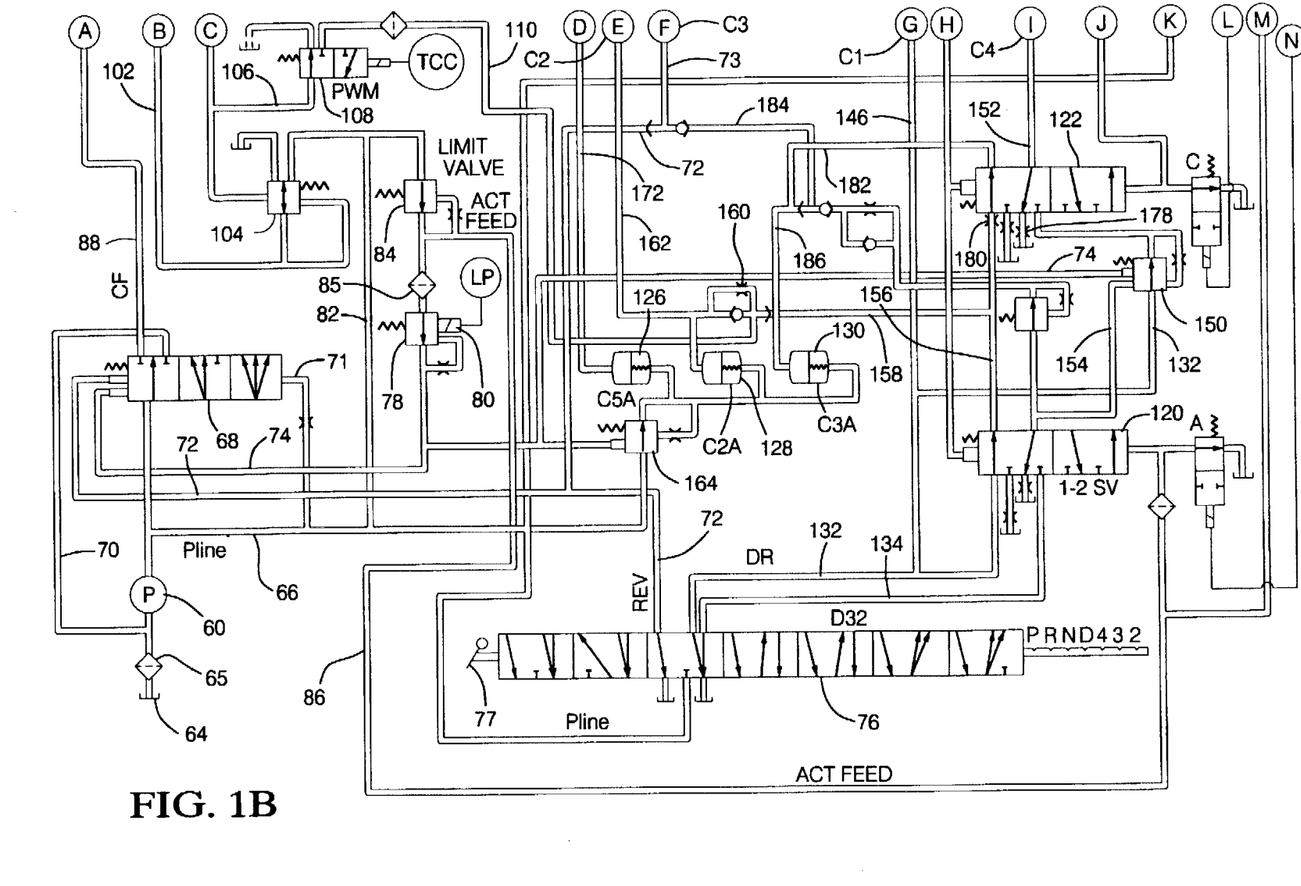

Referring now to FIGS. 1A–1B of the drawings, the control of the present invention is described in reference to a motor vehicle drivetrain 10 including an engine 12 and a planetary transmission 14 having a reverse speed ratio and five forward speed ratios. Engine 12 includes a throttle mechanism 16 mechanically connected to an operator manipulated device, such as an accelerator pedal (not shown), for regulating the air intake of the engine. The engine 12 is fueled by a conventional method in relation to the air intake to produce output torque in proportion thereto. Such torque is applied to the transmission 14 through the engine output shaft 18.

The transmission 14, in turn, transmits engine output torque to an output shaft 20 through a torque converter 24 and one or more of the fluid operated clutches C1–C5, OC, Reverse clutch RC, and one-way clutches 26–30, such clutches being applied or released according to a predetermined schedule for establishing a desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the turbine shaft 42. A stator member 44 redirects the fluid which couples the impeller 36 to the turbine 40, the stator being connected through a one-way device 46 to the housing of transmission 14.

The torque converter 24 also includes a clutch TCC comprising a clutch plate 50 secured to the turbine shaft 42.

The clutch plate 50 has a friction surface 52 formed thereon adaptable to be engaged with the inner surface of the input shell 38 to form a direct mechanical drive between the engine output shaft 18 and the turbine shaft 42. The clutch plate 50 divide the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38, thereby engaging the TCC to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 as shown in FIG. 1a, thereby uncoupling such mechanical drive connection and permitting slippage between the impeller 36 and the turbine 40. The turbine shaft 42 is connected as an input to the carrier Cf of a forward planetary gearset f. The sun Sf is connected to carrier Cf via the parallel combination of one-way clutch F5 and friction clutch OC. The clutch C5 is selectively engageable to ground the sun Sf. The ring Rf is connected as an input to the sun S1r of a compound rearward planetary gearset r via the parallel combination of one-way clutch F1 and friction clutch C3. The clutch C2 selectively connects the forward gearset ring Rf to rearward gearset ring Rr, and the Reverse clutch CR selectively grounds the ring Rr. The sun S2r is selectively grounded by clutch C4 or by clutch C1 through the one-way clutch F2. The long pinion LP mechanically couples sun gears S1r and S2r through short pinion SP, and the carrier Cr is connected as an output to shaft 20.

Figure 2:
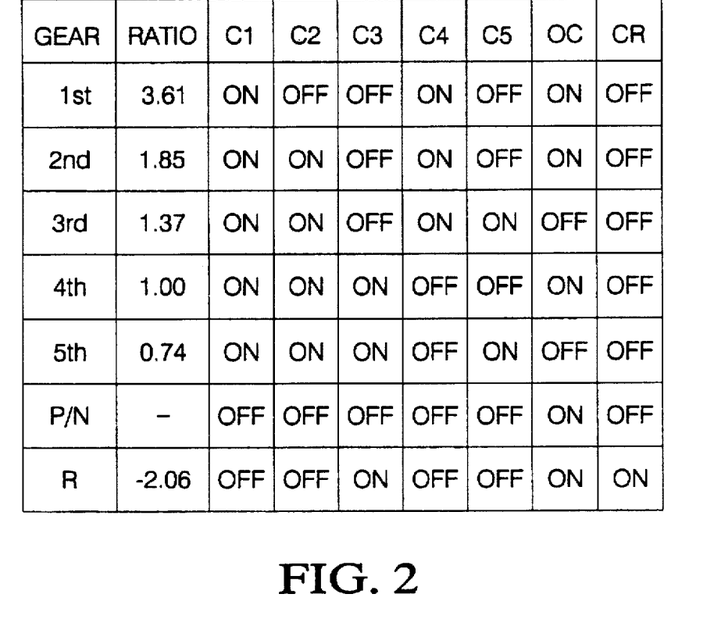
FIG. 2 is a state diagram for the clutches of the transmission depicted in FIGS. 1A–1B.

The various speed ratios and the clutch states required to establish them are set forth in the chart of FIG. 2. Referring to that Figure, it is seen that the Park/Neutral condition is established by releasing all of the clutches. A garage shift to Reverse is effected by engaging the C3, OC and RC clutches. In the forward speed ranges, a garage shift to 1st is effected by engaging the clutches C1, C4 and OC. In this case, the forward gearset f is locked up and the one-way clutch F1 applies the turbine speed Nt as an input to the sun element Sr of rearward gearset r, providing a Ni/No ratio of 3.61.

As the vehicle speed increases, an upshift from 1st to 2nd is effected simply by engaging clutch C2; the one-way clutch F1 overruns as soon as on-coming clutch C2 develops sufficient torque capacity. The forward gearset f remains locked up, and the clutch C2 applies the turbine speed Nt as an input to the ring element Rr of rearward gearset r to provide a Ni/No ratio of 1.85. Downshifting from 2nd to 1st merely involves releasing clutch C2.

The upshift from 2nd to 3rd is effected by engaging clutch C5 and releasing clutch OC so that the forward gearset operates as an overdrive, thereby providing a Ni/No ratio of 1.37. Downshifting from 3rd to 2nd is effected by releasing clutch C5 and engaging clutch OC to return the forward gearset f to a lock-up condition.

The upshift from 3rd to 4th is effected by releasing clutch C5 and engaging clutch OC to return the forward gearset f to a lock-up condition, while releasing clutch C4 and engaging clutch C3 to lock-up the rearward gearset r, one-way clutch F2 releasing the rear planet axis Pr. In this case, the turbine speed Nt is transmitted directly to output shaft 20 for a Ni/No ratio of 1.00. The downshift 4th to 3rd is effected by releasing clutch OC and engaging clutch C5 to return the forward gearset f to an overdrive condition, while releasing clutch C3 and engaging clutch C4 to apply the turbine speed Nt as an input to the ring element Rr.

The timing of the 3–4 upshift and 4–3 downshift state changes must be properly coordinated to avoid conditions which would cause the ratio to change in the wrong direction or at the wrong rate. In the upshift, for example, care must be taken to ensure that on-coming clutch C3 is ready to lock-up the rearward gearset r when off-going clutch C5 is released to lock-up the forward gearset f. Otherwise, the Ni/No ratio initially increases from the b 3rd ratio of 1.37 toward the 2nd ratio of 1.85. Conversely, in the 4–3 downshift, care must be taken to ensure that on-coming clutch C5 is ready to engage to e establish an overdrive condition in the forward gearset f when off-going clutch C3 is released. Otherwise, the Ni/No ratio increases toward the 2nd ratio of 1.85 instead of the 3rd ratio of 1.37.

Completing the shift analysis, the upshift from 4th to 5th is effected by engaging clutch C5 and releasing clutch OC to operate the forward gearset f in an underdrive condition, thereby providing a Ni/No ratio of 0.74. Downshifting from 4th to 3rd is effected by releasing clutch C5 and engaging clutch OC.

A positive displacement hydraulic pump 60 is mechanically driven by the engine output shaft 18. pump 60 receives hydraulic fluid at low pressure from the fluid reservoir 64 and filter 65, and supplies line pressure fluid to the transmission control elements via output line 66. A pressure regulator valve (PRV) 68 is connected to the pump output line 66 and serves to regulate the line pressure by returning a controlled portion of the line pressure to reservoir 64 via the line 70. The PRV 68 is biased at one end by orifice line pressure in line 71 and at the other end by the combination of a spring force, a Reverse ratio fluid pressure in line 72 and a controlled bias pressure in line 74.

The Reverse fluid pressure is supplied by a Manual Valve 76, described below. The controlled bias pressure is supplied by a Line Pressure Bias Valve 78 which develops pressure in relation to the current supplied to electric force motor 80. Line pressure is supplied as an input to valve 78 via line 82, a pressure limiting valve 84 and filter 85. The limited line pressure, referred to as ACT FEED pressure, is also supplied as an input to other electrically operated actuators of the control system via line 86. With the above-described valving arrangement, it will be seen that the line pressure of the transmission is electrically regulated by force motor 80.

In addition to regulating line pressure, the PRV 68 develops a regulated converter feed (CF) pressure for the torque converter 24 in line 88. The CF pressure is supplied as an input to TCC Control Valve 90, which in turn directs the CF pressure to the release chamber 56 of torque converter 24 via line 92 when open converter operation is desired. In this case, the return fluid from torque converter 24 is exhausted via line 94, the TCC Control Valve 90, an oil cooler 96 and an orifice 98. When closed converter operation is desired, the TCC Control Valve 90 exhausts the release chamber 56 of torque converter 24 to an orifice exhaust 100, and supplies a regulated TCC apply pressure in line 102 to the apply chamber 54, thereby engaging the TCC. The TCC apply pressure in line 102 is developed from line pressure by a TCC Regulator Valve 104.

Both the TCC Control Valve 90 and the TCC Regulator Valve 104 are spring biased to effect the open converter condition, and in each case, the spring force is opposed by an electrically developed control pressure in line 106. The control pressure in line 106 is developed by the solenoid operated TCC Bias Valve 108, through a ratiometric regulation of the fluid pressure in line 110. When closed converter operation is desired, the solenoid of TCC Bias Valve 108 is pulse-width modulated at a controlled duty cycle to ramp up the bias pressure in line 106. Bias pressures above the pressure required to shift the TCC Control Valve to the closed-converter state are used to control the TCC apply pressure developed in line 102 by TCC Regulator Valve 104. In this way, the TCC Bias Valve 108 is used to control the torque capacity of the TCC when closed converter operation is desired.

The friction clutches C1–C5, OC and CR are activated by conventional fluid operated pistons P1–P5, POC and PCR, respectively. The pistons in turn, are connected to a fluid supply system comprising the Manual Valve 76 referred to above the Shift Valves 120, 122 and 124, and the Accumulators 126, 128 and 130. The Manual Valve 76 develops supply pressures for Reverse (REV) and the various forward ranges (DR, D32) in response to driver positioning of the transmission range selector 77. The REV, DR and D32 pressures, in turn, are supplied via lines 72, 132 and 134 to the various Shift Valves 120–124 for application to the fluid operated pistons P1–P5, POC and PCR. The shift Valves 120, 122 and 124 are each spring biased against controlled bias pressures, the controlled bias pressures being developed by the solenoid operated valves A, C and B. The accumulators 126,128 and 130 are used to cushion the apply, and in some cases the release, of clutches C5, C2 and C3, respectively.

Figure 3:
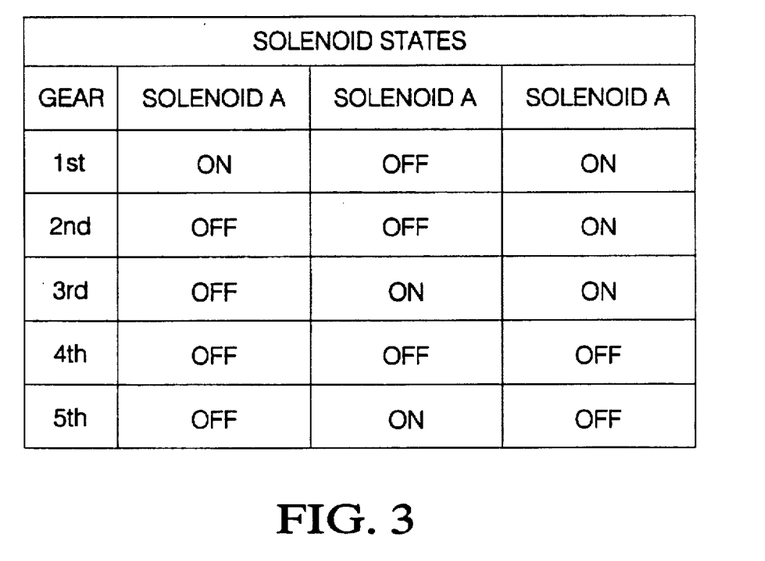
FIG. 3 is a chart depicting the electrical state changes required for shifting from one speed ratio to another.

A chart of the ON/OFF states of valves A, C and B for establishing the various transmission speed ratios is given in FIG. 3. In Neutral and Park, the solenoids A, B and C are all off. In this condition, line pressure is supplied to clutch piston POC through orifice 176, but the remaining clutches are all disengaged. Reverse fluid pressure, when generated by Manual Valve 76 in response to driver displacement of range selector 77, is supplied directly to clutch piston P3 via lines 72,73 and 140, and to clutch piston PCR via lines 72, 142, orifice 144 and Shift Valve 124.

A garage shift to the forward (Drive) ranges is effected when Manual Valve 76 is moved to the D position, connecting line pressure to the DR pressure supply line 132. The DR pressure is supplied to the clutch piston P1 via line 146 and orifice 148 to progressively engage clutch C1. At the same time, Solenoid Operated Valves A and C are energized to actuate Shift Valves 120 and 122. The Shift Valve 122 directs DR pressure in line 132 to clutch piston P4 via Regulator Valve 150 and line 152. The Shift Valve 120 supplies a bias pressure to the Regulator Valve 150 via line 154 to boost the C4 pressure. In this way, clutches C1, C4 and OC are engaged to establish 1st speed ratio.

Referring to the chart of FIG. 3, a 1–2 upshift is effected by deenergizing Solenoid Operated Valve A to return Shift Valve 120 to its default state. This routes DR pressure in line 132 to the clutch piston P2 via Shift Valve 120, lines 156, 158 and 162, and orifice 160 to engage the clutch C2. Line 162 is also connected as an input to accumulator 128, the backside of which is maintained at a regulated pressure developed by valve 164. The engagement of clutch C2 is thereby cushioned as the C2 apply pressure, resisted by spring force, strokes the piston of accumulator 128. Of course, a 2–1 downshift is effected by energizing the Solenoid Operated Valve A.

Referring again to the charge of FIG. 3, a 2–3 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch P5. Line 170 is connected via line 172 as an input to accumulator 126, the backside of which is maintained at a regulated pressure developed by valve 164. The engagement of clutch C5 is thereby cushioned as the C5 apply pressure, resisted by spring force, strokes the piston of accumulator 126. Of course, a 3–2 downshift is effected by deenergizing the Solenoid Operated Valve B.

Referring again to the chart of FIG. 3, a 3–4 upshift is effected by deenergizing Solenoid Operated Valves B and C to return Shift Valves 124 and 122 to their default positions, as depicted in FIGS. 1A–1B. The Shift Valve 124 thereby (1) exhausts clutch piston P5 and accumulator 126 via line 170 and orifice 174 to release clutch C5, and (2) supplies pressure to clutch piston POC via lines 66 and 171 and orifice 176 to engage clutch OC. The Shift Valve 122 (1) exhausts clutch piston P4 via line 152 and orifice 178 to release clutch C4, and (2) supplies DR pressure in line 132 to clutch piston P3 via Shift Valve 120, orifice 180 and lines 182, 184, 73 and 140 to engage clutch C3. Line 182 is connected via line 186 as an input to accumulator 130, the backside of which is maintained at a regulated pressure developed by valve 164. The engagement of clutch C3 is thereby cushioned as the C3 apply pressure, resisted by spring force, strokes the piston of accumulator 130. Of course, a 4–3 downshift is effected by energizing the Solenoid Operated Valves B and C.

Referring again to the chart of FIG. 3, a 4–5 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch P5. As indicated below, line 170 is also connected via line 172 as an input to accumulator 126, which cushions the engagement of clutch C5 as the C5 apply pressure, resisted by spring force, strokes the piston of accumulator 126. Of course, a 5–4 downshift is effected by deenergizing the Solenoid Operated Valve B.

The Solenoid Operated Valves A, B and C, the TCC Bias Valve 108 and the Line Pressure Bias Valve 78 are all controlled by a computer-based Transmission Control Unit (TCU) 190 via lines 192–196. As indicated above, the valves A, B and C require simple on/off controls, while the valves 108 and 78 are pulse-width-modulated (PWM). The control is carried out in response to a number of input signals, including an engine throttle signal %T on line 197, a turbine speed signal Nt on line 198, an output speed signal No on line 199 and a transmission temperature signal Tt on line 204. The throttle signal is based on the position of engine throttle 16, as sensed by transducer T; the turbine speed signal is based on the speed of turbine shaft 42, as sensed by sensor 200; the output speed signal is based on the speed of output shaft 20, as sensed by sensor 202, and the transmission temperature signal Tt is based on the temperature of the fluid in reservoir 64, as determined by the temperature sensor 206. In carrying out the control, TCU 190 executes a series of computer program instructions, represented by the flow diagrams of FIGS. 5–8 described below.

The control of the present invention is set forth in a preferred embodiment to be described. In general, application of the fuzzy logic technique of the present invention is not limited to any specific adaptive shift control, it being understood that the descriptive portions of the following embodiment as related to any specific adaptive shift control are intended merely as contextual and as a framework for understanding and applying the fuzzy logic techniques of the invention. It is recognized in the art of transmission control that the time lapse between a gear change command and the onset of the actual ratio change (shift delay) and the actual time span of the ratio change (shift time) may vary from desirable delays and times between production units of the same transmission and/or over the life of an individual transmission unit. Such deviations from desirable may be unpleasant to the operator and may, in extreme cases, present undue stress upon transmission components. Such variances typically result from insufficient or excessive line pressure relative to the actual line pressure necessary for shift initiation and completion in accordance with the desired shift delay and shift times. Unit to unit variations and time or cycle induced variations in a transmission unit may be correctable through use of adaptive controls which essentially learn the transmission shift response to a commanded line pressure and adjust the commanded line pressure in subsequent shifts to achieve the desired shift characteristics. Adaptive shift controls of this variety are known which work with a base line pressure term for various ratio changes and an adaptive pressure term. One such adaptive control is found in U.S. Pat. No. 5,163,342 to Pollack et al. and is also assigned to the assignee of the present invention. Details of the adaptive control are not repeated herein as they are not necessary for a sufficient disclosure of the present invention. However, the pressure correction terms which are determined in the aforementioned United States Patent are utilized herein as exemplary adaptive quantities in the implementation of the present control.

However, the conditions under which pressure correction terms are updated are limited. For example, conventional practice will suspend updates to a pressure correction term when throttle position or powertrain temperature falls outside prescribed limits. The present invention on the other hand eschews such stringent suspension in favor of expanding the conditions under which pressure corrections are calculated and updating the pressure correction term in accordance with factors embodying varying degrees of confidence in the calculated pressure corrections related to various powertrain parameters. Such an approach, for example, extends the benefits of adaptive control to extreme temperature conditions and driver variations.

Pressure correction terms PChi and PClo, corresponding respectively to high and low pressure correction terms, define a two-point table of pressure correction terms as a function of shift torque STQ. As described below, in reference to the flow diagram of FIG. 6, the pressure command during shifting is determined as a combined function of the scheduled base line pressure and an adaptive pressure determined from the two-point correction table. And, as described with reference to the preferred embodiment of flow diagram of FIG. 7, TCU 190 utilizes three control rules: (i) significant transmission temperature rise AND transmission temperature not too cold; (ii) transmission temperature not too cold AND transmission temperature not too hot; and, (iii) throttle variation not too large. Various degrees of confidence are established in accordance with the control rules as functions of various powertrain operating parameters. In each case, the degree of confidence in the calculated pressure correction is represented by a numerical value, between zero (no confidence) and 1 (complete confidence). In FIG. 4C for example, the numerical value is one at transmission temperatures in a range between temperature values ($T_4$–$T_5$), decreasing as transmission temperature moves outside the range, and zero for temperatures less than $T_3$ or greater than $T_6$. Control rule (ii) above is thereby seen to be embodied in the individual exemplary function graphically illustrated in figure 4C.

Figure 4A:
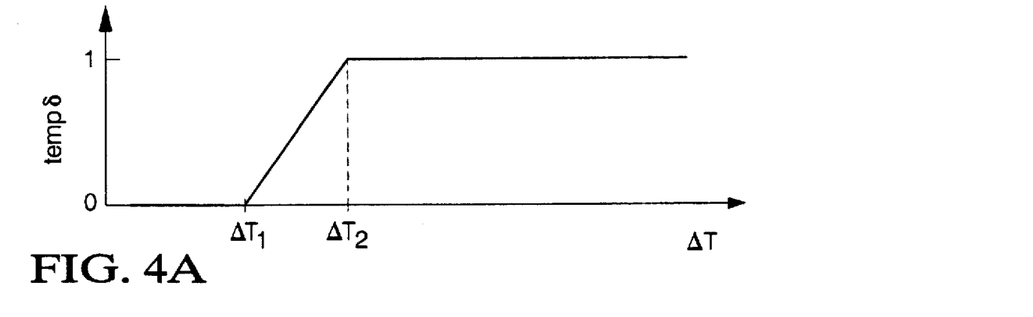
FIGS. 4A–4D graphically depict various functions of powertrain operating parameters used to develop various degrees of confidence in accordance with the present invention; and, FIGS. 5–8 depict flow charts representing sets of computer program instructions executed by the control unit of FIG. 1A for carrying out the control of the present invention.
Figure 4B:
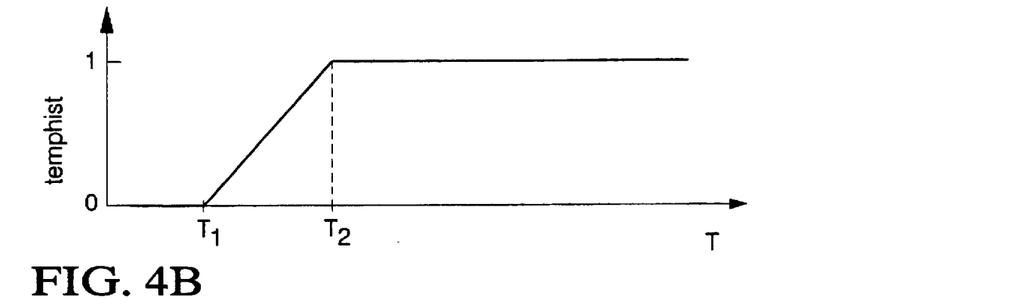
Figure 4C:
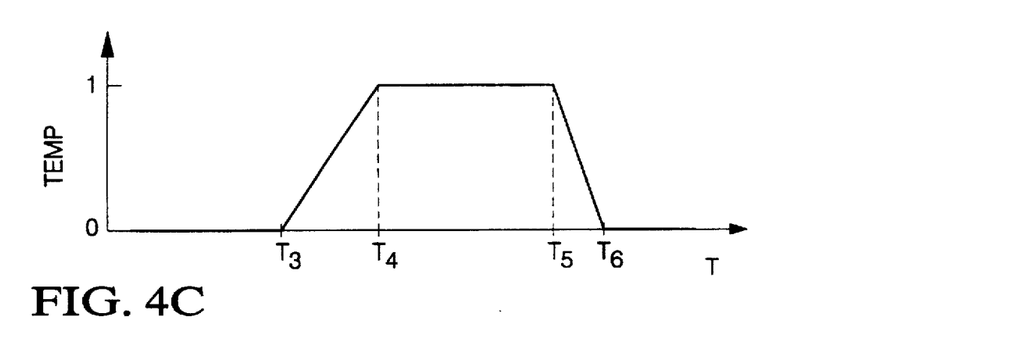

Control rule (i) above, on the other hand, is seen to be embodied in the combination of functions graphically illustrated in FIGS. 4A and 4B. For example, if the numerical values corresponding to the transmission temperature rise and the transmission temperature together indicate substantial rise in transmission temperature from a relatively warm temperature, both values would be one and the degree of confidence, as the product thereof, would also be one. If, however, the numerical values corresponding to the transmission temperature rise and the transmission temperature together indicate substantial rise in transmission temperature from a relatively cold temperature, the values corresponding thereto would be one and between zero and one, respectively. The degree of confidence as the product of the two values would be less than one, thus indicating a lesser degree of confidence. Of course, varying degrees of confidence will be returned in accordance with the product of the values corresponding to the individual functions.

Figure 4D:
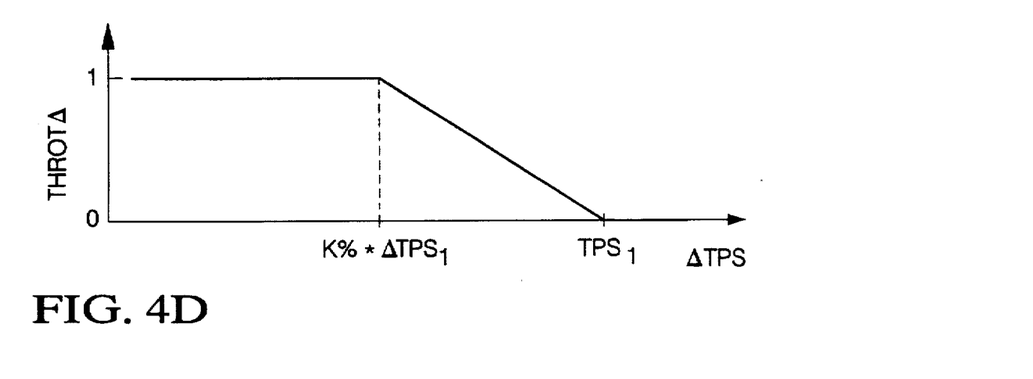

These temperature based degrees of confidence are weighted according to their criticality as empirically determined, and the sum thereof weighted by a degree of confidence established via a throttle variation function [control rule (iii) and FIG. 4D] to form an overall confidence factor which is used to determine the update to the pressure correction terms from the calculated pressure corrections.

Figure 5:
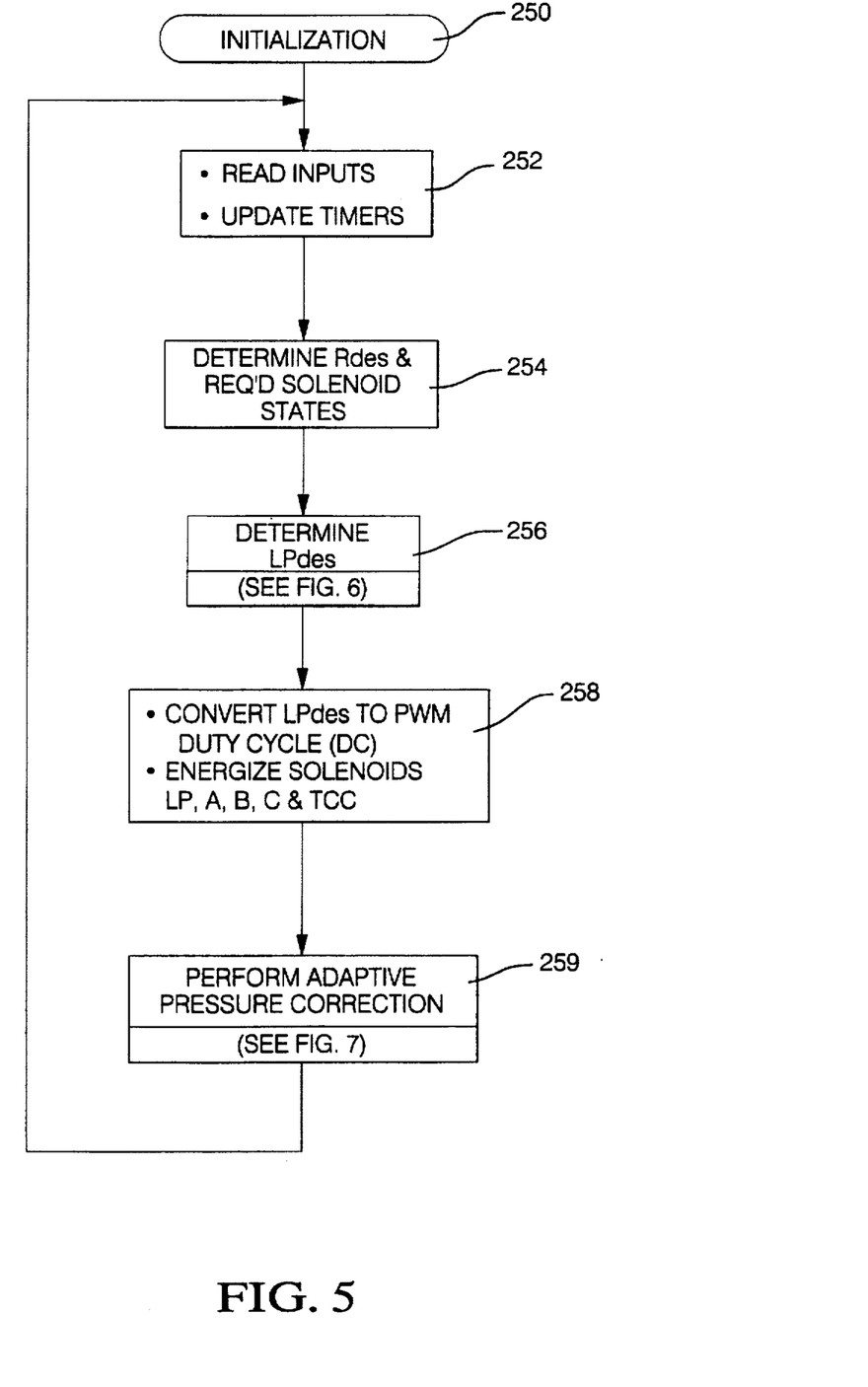

Referring now to FIGS. 5–8, the flow diagram of FIG. 5 represents a main or executive computer program which is periodically executed in the course of vehicle operation in carrying out the control of the present invention. The block 250 designates a series of program instructions executed at the initiation of each period of vehicle operation for setting various terms and timer values to an initial condition. Thereafter, blocks 254–259 are sequentially and repeatedly executed as indicated by the flow diagram lines.

At block 252, the control unit 190 reads the various inputs referenced in FIG. 1a and updates the loop timers, if any. The block 254 determines the desired speed ratio Rdes and required states of solenoids A, B and C for achieving the desired speed ratio. The desired speed ratio may be determined in a conventional manner as a predefined function of engine throttle position TPS and vehicle speed Nv.

Figures 6, 7:
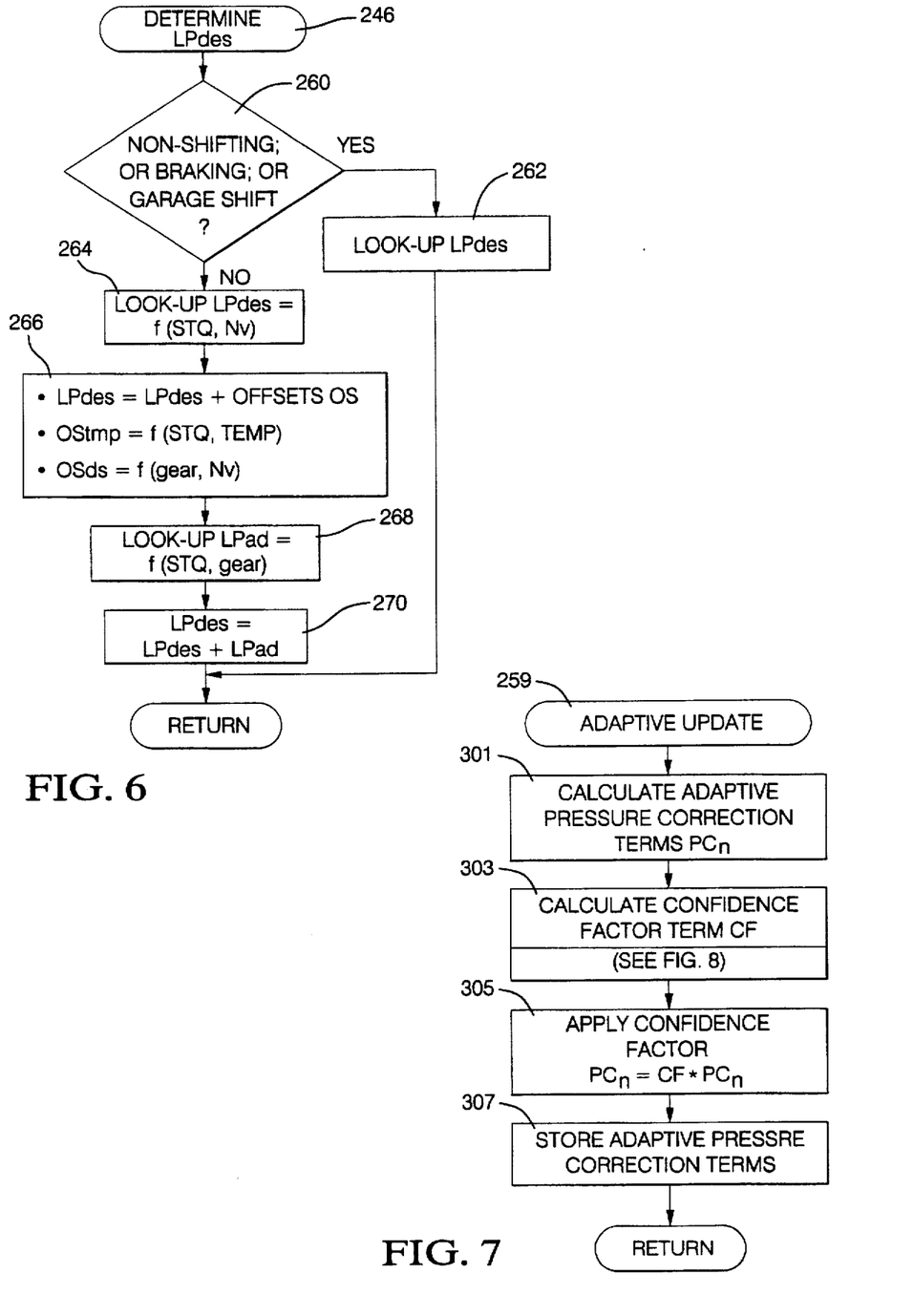

The block 256, described in further detail in the flow diagram of FIG. 6, determines the desired line pressure LPdes. The block 258 converts the desired line pressure LPdes to a PWM duty cycle for force motor 80, and suitably energizes the various electro-hydraulic elements including the force motor 80, the TCC solenoid valve 108, and shift valve solenoids A, B and C. The block 259, described in further detail in the flow diagram of FIG. 7, develops updates to pressure corrections as described above.

Referring to the line pressure determination flow diagram of FIG. 6, the block 260 is first executed to determine if the transmission is in a non-shifting mode, an engine braking mode, or if a garage shift is in progress. If any of these conditions are met, the block 262 is executed to determine the desired line pressure LPdes using mode-specific look-up tables, not described herein. Otherwise, the transmission is in a shifting mode, and the blocks 264–270 are executed to look-up the base line pressure LPdes as a function of shift torque STQ and vehicle speed Nv, to apply the appropriate offsets, and to look-up and apply the adaptive pressure LPad.

The offsets identified in block 266 include a downshift offset OSds and a temperature offset OStmp. The downshift offset OSds is determined as a function of gear and vehicle speed, and the temperature offset OStmp is determined as a function of the transmission oil temperature.

As described above, the adaptive pressure LPad is determined as a function of the shift torque STQ and target speed ratio. This look-up involves an interpolation between the high and low pressure correction values PChi and PClo as described above. Calculation of pressure corrections in the present invention is not suspended in adherence to conventional qualifiers such as throttle position or powertrain temperatures as previously mentioned. Rather, in the adaptive update flow diagram of FIG. 7, the steps represented by block 301 are engaged without reservation to calculate pressure corrections through substantially all operating conditions of the transmission. This step includes the calculation of the high and low pressure correction values PChi and PClo. These terms are represented in the flow diagram together for brevity as $PC_n$. An overall confidence factor CF is, however, developed at block 303 as further described with respect to the flow diagram of FIG. 8. Application of the overall confidence factor CF to the pressure correction values $PC_n$ takes place at block 305 to establish the pressure correction terms to be written to the two-point table of pressure correction at step 307 for use in subsequent adaptive pressure determinations as described in FIG. 6.

Figure 8:
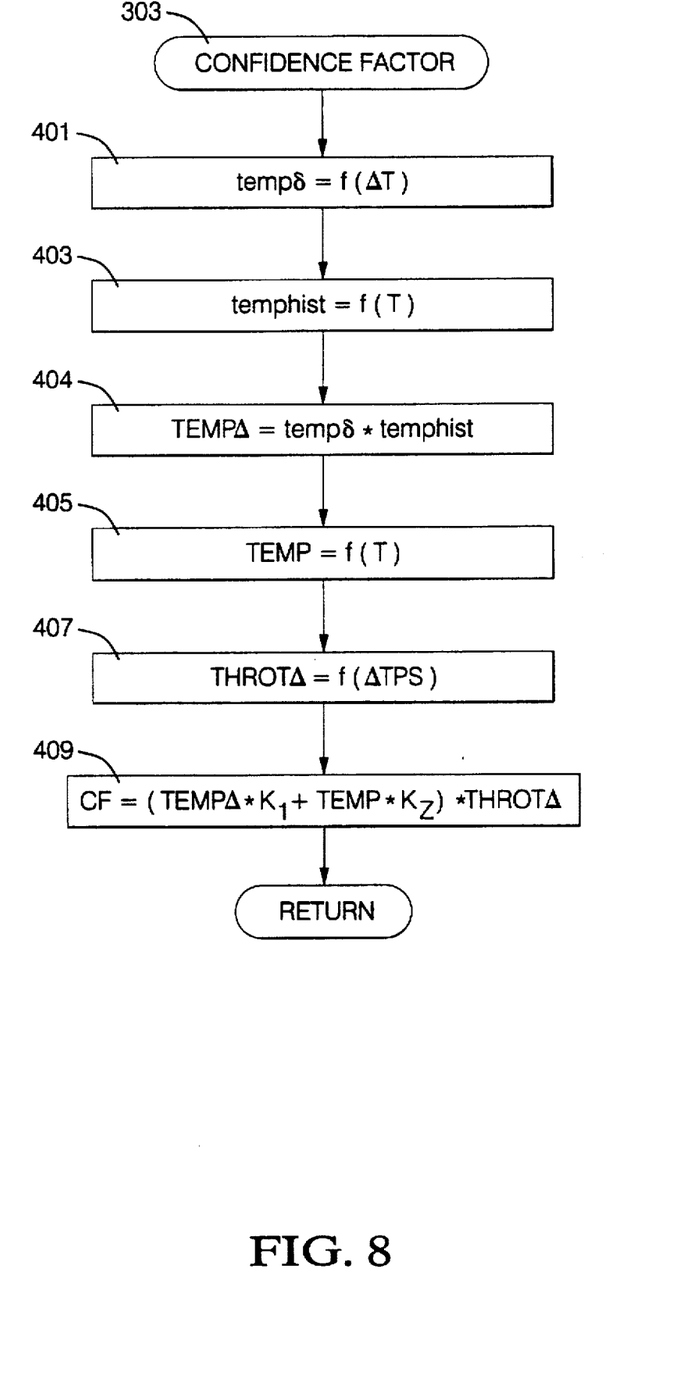

Referring now to the flow diagram of FIG. 8 and to related FIGS. 4A–4D, blocks 401–407 exemplify general characteristics of factors as functions of various powertrain operating parameters. Block 401 returns a value for a transmission temperature rise factor (tempδ) limited to between 0 and 1 as a function of transmission temperature change (ΔT). ΔT in this embodiment is determined from the historical value of transmission temperature at the initiation of the current period of vehicle operation and the transmission temperature substantially contemporaneous with the present ratio change. In the present embodiment:

$$\text{temp}\delta = (\Delta T - \Delta T_1)/(\Delta T_2 - \Delta T_1) \tag{1a}$$

where the subscripted values are calibration constants which define the factor as illustrated in FIG. 4A.

Block 403 returns a value for a temperature history factor (temphist) limited to between 0 and 1 as a function of transmission temperature (T). T in this embodiment is the transmission temperature substantially contemporaneous with the present ratio change. In the present embodiment:

$$\text{temphist} = (T - T_1)/(T_2 - T_1) \tag{1b}$$

where the subscripted values are calibration constants which define the factor as illustrated in FIG. 4B.

As shown in block 404, the first and second transmission temperature rise factors, tempδ and temphist, together define a history-adjusted temperature rise factor (TEMPΔ) according to the relationship:

$$\text{TEMP}\Delta = \text{temp}\delta * \text{temphist} \tag{2}$$

The resultant history-adjusted temperature rise factor TEMPΔ therefore embodies control rule (i) wherein significant transmission temperature rise from an initial transmission temperature which is not too cold yields a high degree of confidence in performing an update to the adaptive pressure terms.

Block 405 similarly returns a value for a transmission warm factor (TEMP) limited to between 0 and 1 as a function of transmission temperature (T), again substantially contemporaneous with the present ratio change. In the present embodiment:

$$\text{TEMP} = (T - T_3)/(T_4 - T_3) \text{ for } T \leq T5 \tag{3a}$$

$$\text{TEMP} = (T_6 - T)/(T_6 - T_5) \text{ for } T > T5 \tag{3b}$$

where the subscripted values are calibration constants which define the factor as illustrated in FIG. 4C. The resultant transmission warm factor TEMP therefore embodies control rule (ii) wherein a warm transmission, that is one which is not excessively hot or excessively cold, yields a high degree of confidence in performing an update to the adaptive pressure terms.

Finally, block 407 returns a value for a throttle deviation factor (THROTΔ) limited to between 0 and 1 as a function of change in throttle position (ΔTPS). ΔTPS in this embodiment is determined during the present shift event. In the present embodiment:

$$\text{THROT}\Delta = (\Delta TPS_1 - \Delta TPS)/\Delta TPS_1/K\% \tag{4}$$

where $\Delta TPS_1$ is the upper limit throttle deviation calibration and K% is a fractional calibration constant utilized to define the lower limit throttle deviation calibration as a function of the upper limit throttle deviation calibration $\Delta TPS_1$ as shown in FIG. 4D. The resultant throttle deviation factor THROTΔ therefore embodies control rule (iii) wherein excessive throttle step-in or step-out during the shift event yields a low degree of confidence in performing an update to the adaptive pressure terms.

Continuing with block 409, an overall confidence factor CF is derived from the previously described factors. This is accomplished presently by weighting the temperature based factors TEMPΔ and TEMP by weights $K_1$ and $K_2$ as shown and multiplying the summation of the weighted factors by the throttle based factor THROTΔ.

While the invention has been described by way of a preferred embodiment, it is expected that various modifications will occur to those skilled in the art. Therefore, it is to be understood that such modifications are within the scope of the present invention which is defined by the appended claims.

We claim:

1. An improved method of adaptive shift control for a multi-ratio, electronically-controlled, automatic transmission coupled at an input thereof to a throttle controlled internal combustion engine, said transmission effective to establish speed ratio changes between input and output shafts thereof in accordance with predetermined line pressure commands including a base pressure term and an updatable adaptive pressure term, the improvement comprising:

providing a pressure correction term upon the execution of a ratio change regardless of predetermined powertrain operating parameters;

calculating a plurality of degrees of confidence in the provided pressure correction term in accordance with a corresponding plurality of functions of the predetermined powertrain operating parameters;

deriving an overall confidence factor from said plurality of degrees of confidence; and, updating the adaptive pressure term from said provided pressure correction term in proportion to the overall confidence factor.

2. The method as claimed in claim 1 wherein the step of deriving an overall confidence factor includes weighting the plurality of degrees of confidence in accordance with respective predetermined measures of criticality.

3. The method as claimed in claim 1 wherein the step of calculating a plurality of degrees of confidence in the pressure correction term includes the steps of:

calculating a first one of said plurality of degrees of confidence according to predetermined criteria of transmission temperature change and transmission temperature;

calculating a second one of said plurality of degrees of confidence according to a predetermined criterion of transmission temperature; and calculating a third one of said plurality of degrees of confidence with respect to a predetermined criteria of throttle variation.

4. The method as claimed in claim 3 wherein the step of calculating the first one of said plurality of degrees of confidence is performed with the transmission temperature established substantially contemporaneous with the ratio change and the transmission temperature change established relative to the transmission temperature and a predetermined historical transmission temperature.

5. The method as claimed in claim 3 wherein the step of calculating the second one of said plurality of degrees of confidence is performed with the transmission temperature established substantially contemporaneous with the ratio change.

6. The method as claimed in claim 3 wherein the step of calculating the third one of said plurality of degrees of confidence is performed with the throttle variation established substantially contemporaneous with the ratio change.

7. An improved method of adaptive shift control for a multi-ratio, electronically-controlled, automatic transmission coupled at an input thereof to a throttle controlled internal combustion engine, said transmission effective to establish speed ratio changes between input and output shafts thereof in accordance with predetermined line pressure commands including a base pressure term and an updatable adaptive pressure term, the improvement comprising:

determining a first transmission temperature when the engine is started;

determining a second transmission temperature substantially contemporaneous with a ratio change;

determining from said first and second transmission temperatures a transmission temperature change;

periodically monitoring throttle position during the ratio change and determining therefrom a throttle position change;

providing a pressure correction term upon the execution of the ratio change;

calculating a first degree of confidence in the provided pressure correction term according to predetermined criteria of said transmission temperature change and said second transmission temperature;

calculating a second one degree of confidence in the provided pressure correction term according to a predetermined criterion of said second transmission temperature; and calculating a third degree of confidence in the provided pressure correction term with respect to a predetermined criteria of said throttle change;

deriving an overall confidence factor from said plurality of degrees of confidence; and, updating the adaptive pressure term from said provided pressure correction term in proportion to the overall confidence factor.

8. The method as claimed in claim 7 wherein the step of deriving an overall confidence factor includes weighting the degrees of confidence in accordance with respective predetermined measures of criticality.

* * * * *